United States Patent [19]
Kaplan et al.

[11] Patent Number: 5,459,781
[45] Date of Patent: Oct. 17, 1995

[54] SELECTIVELY ACTIVATED DUAL TONE MULTI-FREQUENCY DETECTOR

[75] Inventors: Jeffrey I. Kaplan, Montclair; Nicholas Zwick, Denville, both of N.J.

[73] Assignee: Dialogic Corporation, Parsippany, N.J.

[21] Appl. No.: 180,883

[22] Filed: Jan. 12, 1994

[51] Int. Cl.$^6$ .............................. H04M 3/00; H04M 1/64
[52] U.S. Cl. .............. 379/351; 379/77; 379/88; 379/282; 379/283
[58] Field of Search .................................. 379/67, 74, 77, 379/88, 89, 351, 377, 386, 420, 411, 412, 281, 282, 283, 406, 410

[56] References Cited

U.S. PATENT DOCUMENTS

| | | | |
|---|---|---|---|
| 3,647,985 | 3/1972 | Langendorf et al. | 379/77 |
| 4,313,038 | 1/1982 | Nilssen et al. | 379/283 |
| 4,386,239 | 5/1983 | Chien | 379/386 |
| 4,431,872 | 2/1984 | Edwards | 379/351 |
| 4,477,698 | 10/1984 | Szlam | 379/377 |
| 4,521,647 | 6/1985 | Olson | 379/351 |
| 4,540,855 | 9/1985 | Szlam | 379/377 |
| 4,599,495 | 7/1986 | Richards | 379/351 |
| 4,885,763 | 12/1989 | O'Brien et al. | 379/67 |
| 4,979,214 | 12/1990 | Hamilton | 379/386 X |
| 5,010,567 | 4/1991 | Tsushima | 379/77 |
| 5,070,526 | 12/1991 | Richmond et al. | 379/372 |
| 5,113,432 | 5/1992 | Van Santbrink et al. | 379/100 |
| 5,155,760 | 10/1992 | Johnson et al. | 379/67 |
| 5,172,406 | 12/1992 | Locke | 379/88 |
| 5,311,575 | 5/1994 | Oh | 379/88 |
| 5,325,425 | 6/1994 | Novas et al. | 379/100 |
| 5,327,492 | 7/1994 | Parola | 379/361 |

OTHER PUBLICATIONS

Algorithms for Multichannel DTMF Detection for the WE DSP32 Family [Gay et al.].
DTMF Talk Off Immunity Without Real Time Consumption. [Kerbis].
A Study on the Feasibility of Parcor-Type Receiver in DTMF Signalling [Kyeong et al].
"Digitol MF Receiver Using Discrete Fourier Transform", Kovel et al. IEEE Transactions on Communications, vol. COM-21, No. 12, Dec. 1973, pp. 1331-1335.

Primary Examiner—Jeffery A. Hofsass
Assistant Examiner—Scott L. Weaver

[57] ABSTRACT

A technique for improved DTMF detection utilizes a speech detector, either alone or in combination with other information from a voice processing arrangement, to adjust the sensitivity of the DTMF detector. The DTMF detector is turned completely off when the voice processing application is in the record mode, and when speech is detected.

3 Claims, 4 Drawing Sheets

SELECTIVELY ACTIVATED DUAL TONE MULTI-FREQUENCY DETECTOR

TECHNICAL FIELD

This invention relates to the telephony art, and more particularly, to an improved apparatus for detecting tones (e.g., Dual Tone Multi-Frequency (DTMF) tones) transmitted over telephone lines.

BACKGROUND OF THE INVENTION

DTMF is a means of implementing communications between telephone equipment. DTMF utilizes a unique pair of frequencies to represent each of a plurality of digits, and was initially invented as a way to allow an end user to communicate to a central office, using a telephone terminal (the number of a called party).. In this initial application, after the central office received the DTMF tones, it could disable or ignore its DTMF detector and use the information (i.e, the called party's telephone number) acquired from the DTMF tones to route the call through the telephone network.

As is well known in the art, DTMF is now commonly used as a means for a user to provide a signal to an apparatus which is performing a voice processing application. For example, DTMF is now used to allow bank customers to request balances, transfer money between accounts, etc. DTMF is used by numerous businesses to allow customers to select purchasing options, etc., and in countless other business applications.

In these newer types of DTMF applications, the properties of the DTMF environment are not as well defined as in the initial application previously set forth. For example, in these new applications, the DTMF detector must be capable of receiving and correctly decoding DTMF tones which have been transmitted (i) from a user equipment to a PBX, (ii) through a central office switch, (iii) over a long distance network, (iv) through another central office switch to a receiving PBX, and (v) finally to a voice processing apparatus.

Furthermore, since the DTMF is now being used after the call is connected, not just for call set up and routing as was previously the case, there will be voice and other signals on the line while the DTMF detector is active. Indeed, voice processing applications generally require the DTMF detector to be capable of recognizing DTMF tones simultaneous with recording a message or playing a message. Nonetheless, the DTMF detector must be capable of interpreting the tones in a reliable manner, even though these tones may be significantly degraded when compared to DTMF tones transmitted from a user equipment to a DTMF detector located at the user equipment's own local central office. If the DTMF detector mistakes an outgoing recording from the voice processing system or an incoming speech signal as a valid DTMF tone, the entire voice processing system may enter some undesired mode, resulting in system failure.

In order to deal with the numerous problems of DTMF detection in a voice processing environment, many techniques have been proposed. See, for example, U.S. Pat. No. 4,599,495 to Richards. Nearly all of these prior art arrangements utilize complex signal processing in the DTMF detector in order to distinguish voice from DTMF tones. These arrangements therefore all require a complex and expensive DTMF detector.

U.S. Pat. No. 4,386,239 to Chien describes, in the background section, an arrangement that utilizes a voice filter to turn off the detector if the energy detected within the voice band is higher than a predetermined level. Such a system suffers from numerous drawbacks. For example, if the energy in the voice band is higher than the predetermined level, it may very well be noisy DTMF tones producing that energy, rather than voice. Moreover, a sudden spike of noise on the line can drive the amplitude of the signal in the voice band above the detection threshold, thereby resulting in shutdown of the DTMF detector. Finally, played back voice messages which are not properly echo cancelled may result in the DTMF detector being turned off.

SUMMARY OF THE INVENTION

The above and other problems of the prior art are overcome in accordance with the teachings of the present invention which relates to a method and apparatus for significantly decreasing the probability of a DTMF detector mistakenly decoding a segment of voice as a valid DTMF tone. It is understood that the term DTMF detector as used herein may include not only the detector, but decoding means, etc.

In accordance with one embodiment of the invention, means are provided which monitor the telephone line during the duration of a telephone call, and determine when there is speech being received from a remote user and when there is not. The determination is made by analyzing signals received within the voice bandwidth to determine whether such signals include speech.

Importantly, the speech detector does not simply detect energy in the voice channel. Rather, as used herein, a speech detector is a device which analyzes the received signal to determine whether speech is present, or whether the signal is simply energy of some other type that is in the voice bandwidth. Such analyses may include, for example, examining the signal's envelope, purity, higher harmonics, etc.

Whenever there is speech being received, the DTMF detector is deactivated so that no DTMF tones can be detected, thereby taking advantage of the fact that a user is unlikely to enter DTMF tones while simultaneously speaking. During times when there is no speech present, the DTMF detector is reactivated.

In a second embodiment of the invention, the DTMF detector is only deactivated when (i) the speech detector detects speech on the telephone line, and (ii) the voice processing application determines, independently of any signal being received from the telephone line, that it is unlikely DTMF tones would be received. In this embodiment, the voice processing application may know from the particular mode in which it is (e.g., record mode) that it is unlikely that DTMF tones would be entered. For example, when a speaker is speaking, he does not typically simultaneously enter DTMF tones.

Optional enhancements include utilizing a double talk detector within an echo canceller to assist in adjusting the DTMF parameters, and utilizing the speech detector to adjust not only DTMF parameters, but other parameters as well. Moreover, the speech detector can be utilized to alter the activities of a voice processing application so that when there is no speech present, resources for recording and interpreting speech are not wasted. Finally, a message played back from a voice processing application is monitored to detect the simulation of DTMF tones therein. Upon such detection, the DTMF detector is desensitized to the particular tone being simulated in the played back message.

DETAILED DESCRIPTION OF THE PREFERRED EMBODIMENT

Figure 1:
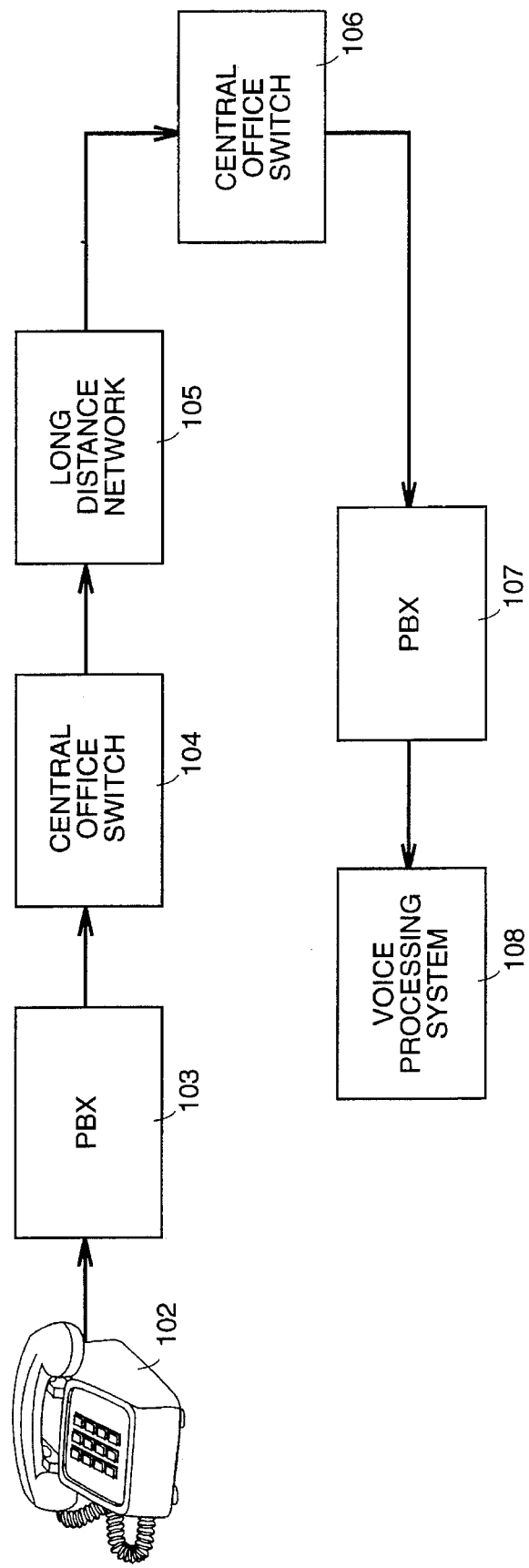
FIG. 1 shows a high level block diagram of the components of a telephone connection from a caller to a voice processing application.

FIG. 1 depicts an exemplary telephone connection from a user terminal 102 to a voice processing system 108. As previously discussed, the connection includes numerous types of switching and other equipment. An actual connection may not include all of the elements shown in FIG. 1. For example, if the voice processing system 108 and the user terminal 102 are located in the same town, long distance network 105 will not be needed.

Voice and DTMF signals originating at the user terminal 102 are routed through PBX 103 to a central office switch 104. As indicated in FIG. 1, the signals then traverse a long distance network 105, which network may include any combination of numerous media such a satellite, fiber optic, microwave, etc. The voice and DTMF signals are then received by central office switch 106, which routes them to a PBX 107 for transmission to a voice processing system 108. The voice processing system includes one or more voice processing applications as is well known in the art.

The voice processing application typically includes a DTMF detector for accepting information in the form of DTMF tones from a caller operating user terminal 102. FIG. 1 demonstrates how the architecture of the system emphasizes the problem of distinguishing DTMF tones from voice. Specifically, a signal originating at user terminal 102 must traverse numerous different switching equipment and communications media before reaching the voice processing system 108. Thus, the signal finally received at voice processing application 108 will include noise, interference, etc. Moreover, a voice signal leaving user terminal 102 may include energy in the frequency bands corresponding to one or more DTMF tones. Thus, the DTMF detector at the voice processing system may mistake a noisy voice signal for DTMF tones, causing the voice processing system to enter some undesired mode.

Figure 2:
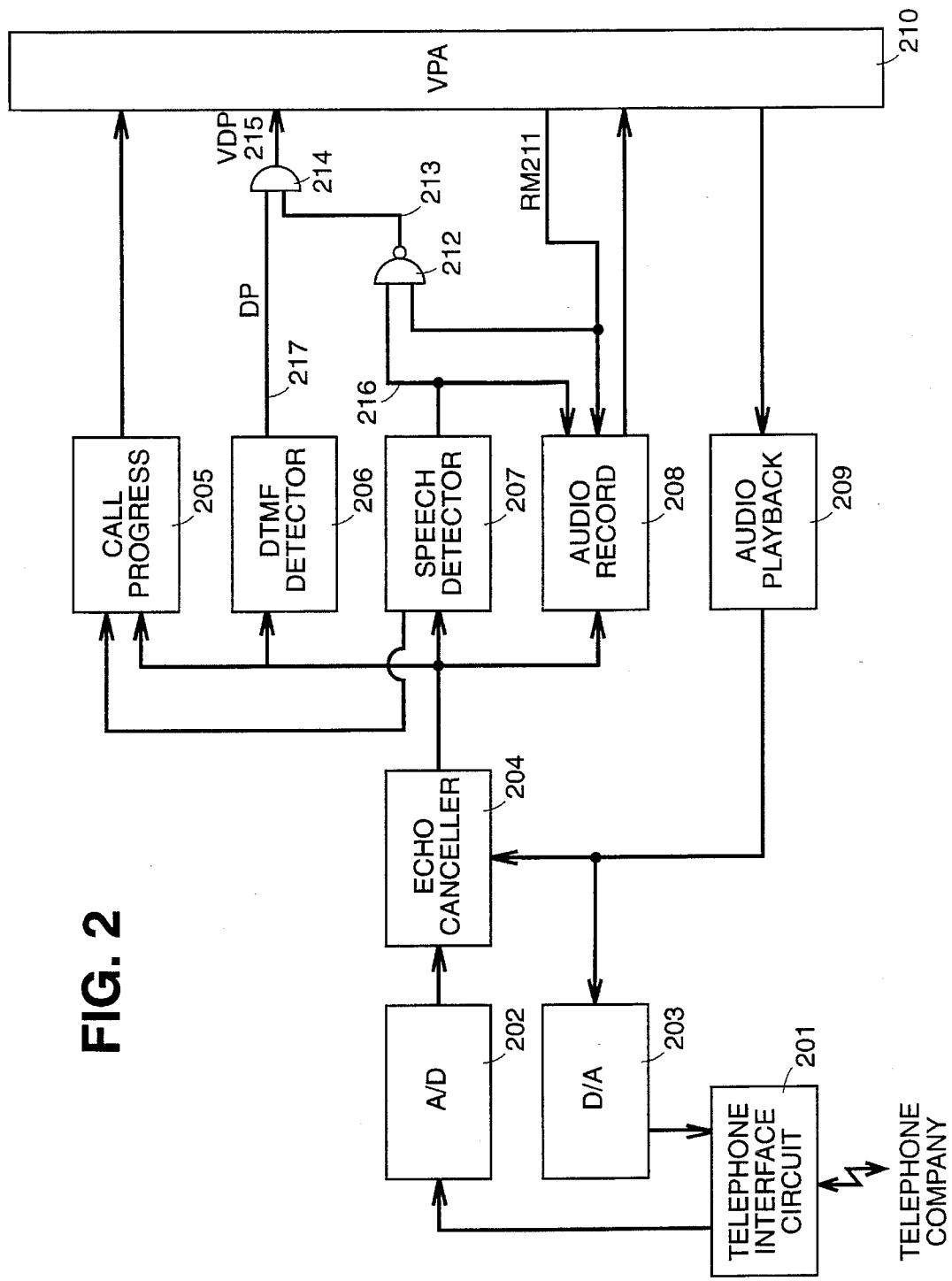
FIG. 2 depicts a functional block diagram of the present invention.

FIG. 2 shows a block diagram of a device in accordance with the teachings of the present invention. Such a device would be used to interface the voice processing system 108 either directly to the telephone network or to a PBX for connection to the telephone network.

The arrangement of FIG. 2 includes a telephone interface circuit 201, for transmitting and receiving signals from either a PBX or the telephone line. Analog-to-Digital (A/D) convertor 202 and Digital-to-Analog (D/A) convertor 203 may be purchased as a single package, known in the art as a Coder/Decoder (Codec).

Echo canceller 204 serves to cancel echoes on the telephone lines caused by impedance mismatch. Echo cancellers are known in the art and the details of the design of one exemplary echo canceller are set forth in the paper "Digital Voice Echo Canceller with TMS32020" by Messerschmitt and available from Texas Instruments. This paper is hereby incorporated by reference. Of course, other echo cancellers may be utilized.

Call progress monitor 205 detects signals such as busy, ringing, etc. The implementation of such a device is well known in the art, as exemplified by U.S. Pat. Nos. 4,540,855 and 4,477,698, both of which are hereby incorporated by reference. DTMF detector 206 detects and decodes DTMF tones entered by the remote user. Numerous DTMF detectors are known in the art, one such detector being described in "General Purpose Tone Decoding and DTMF Detection" by Craig Marven and available from Texas Instruments. This article is also hereby incorporated by reference.

Speech detector 207 detects the presence of speech in an incoming signal. An exemplary speech detector is shown and described in U.S. Pat. Nos. 4,979,214 (the '214 patent) to Hamilton and assigned to the assignee of the present application. The '214 patent is incorporated by reference herein. The exemplary voice processing application (VPA) 210 may be of the type which receives and plays back voice messages. Additionally, VPA 210 may have the capability to dial out using DTMF tones, or to execute commands based upon remotely entered DTMF tones.

Audio Record process 208 and Audio Playback process 209 are also well known among those in the voice processing industry. These portions of the system serve to assist VPA 210 in recording and playing back voice messages to and from a remote user.

In operation, a telephone connection is established between a remote user terminal (not shown) and an exemplary voice processing application 210. When VPA 210 is in playback mode, meaning that a message is being played to the remote user, the message is sent to audio playback process 209. Playback process 209 produces the audio signal and transmits it to D/A convertor 203, which transmits the voice signal in analog form out over the telephone line. The played back signal is also fed to echo canceller 204, as shown, in order to help cancel echoes being received from the telephone line.

During record mode (e.g., when the caller desires to enter a voice message), the incoming voice message is digitized by A/D convertor 202 and recorded in digital form by audio record process 208. Whether in record mode, playback mode or any other mode, signals received from the telephone line are input to a variety of voice processing functions as indicated by blocks 205–207. Of course, there may be one or more additional such functions, or, alternatively, one or more of the voice processing functions shown may be eliminated.

In accordance with the teachings of the present invention, when VPA 210 is to begin recording incoming speech, a Record Mode (RM) signal on line 211 is driven high. Not only does this signal activate the record mode process 208, but it also drives high one of the two inputs to NAND gate 212.

As shown in FIG. 2, speech detector 207 analyzes the signal being received, and drives line 216 high if it determines that speech is present. It can therefore be appreciated that the output 213 of NAND gate 212 will be driven low when both (i) speech is detected by speech detector 207, and (ii) VPA 210 is in the record mode.

During any time that output 213 of NAND gate 212 is low, Valid Digit Present (VDP) line 215 from AND gate 214 will be low. The detection of a DTMF digit during this time by DTMF detector 206 will place a high on Digit Present (DP) line 217, but this DP signal will effectively be masked off because it will not pass through AND gate 214. Thus, when VPA 210 is in record mode and the remote user is speaking, any DP signal from DTMF detector 206 which indicates a DTMF digit is present will be ignored.

The arrangement takes advantage of the fact that during record mode, the remote user is unlikely to press a DTMF digit while he is speaking. While this example uses record mode, it should be understood that the invention contemplates changing DTMF detection parameters based upon the VPA being in any predetermined one or more of its possible modes.

In a second embodiment of the invention, the record mode input to NAND gate 212 can be eliminated. This input to NAND gate 212 can be placed in a permanent high state. The DTMF detector would then be deactivated whenever there is speech detected. This embodiment may be less desirable because speech detector 207 could, during playback, detect echoed speech and deactivate the DTMF detector. Thus, the remote user may not be able to cut through messages being played back during a time when those played back messages simulate a DTMF tone.

In an additional embodiment, the speech detector is utilized as an input to VPA 210 in order to assist in adjustment of parameters during recording. Specifically, when the speech detector determines that there is no speech being received, storage space in the voice processing application may be preserved by not recording silence, DTMF tones, noise, etc. The system may record the length of time during which there is no speech. Upon playback, a silent period of equal duration can be reinserted.

Moreover, processing power in VPA 210 can be more effectively utilized because VPA 210 can perform other tasks or enter other modes during intervals of time where there is no speech present. Indeed, the detection of speech can be used as an input to modify the activities (i.e., change the mode) of VPA 210 in any desired manner as user specific requirements dictate. In an optional enhancement, the echo canceller 204 is employed to assist in the adjustment of the parameters of DTMF detection. Before describing this enhancement, it is believed that a brief review of the function and purpose of echo cancellers would be helpful.

Figure 3:
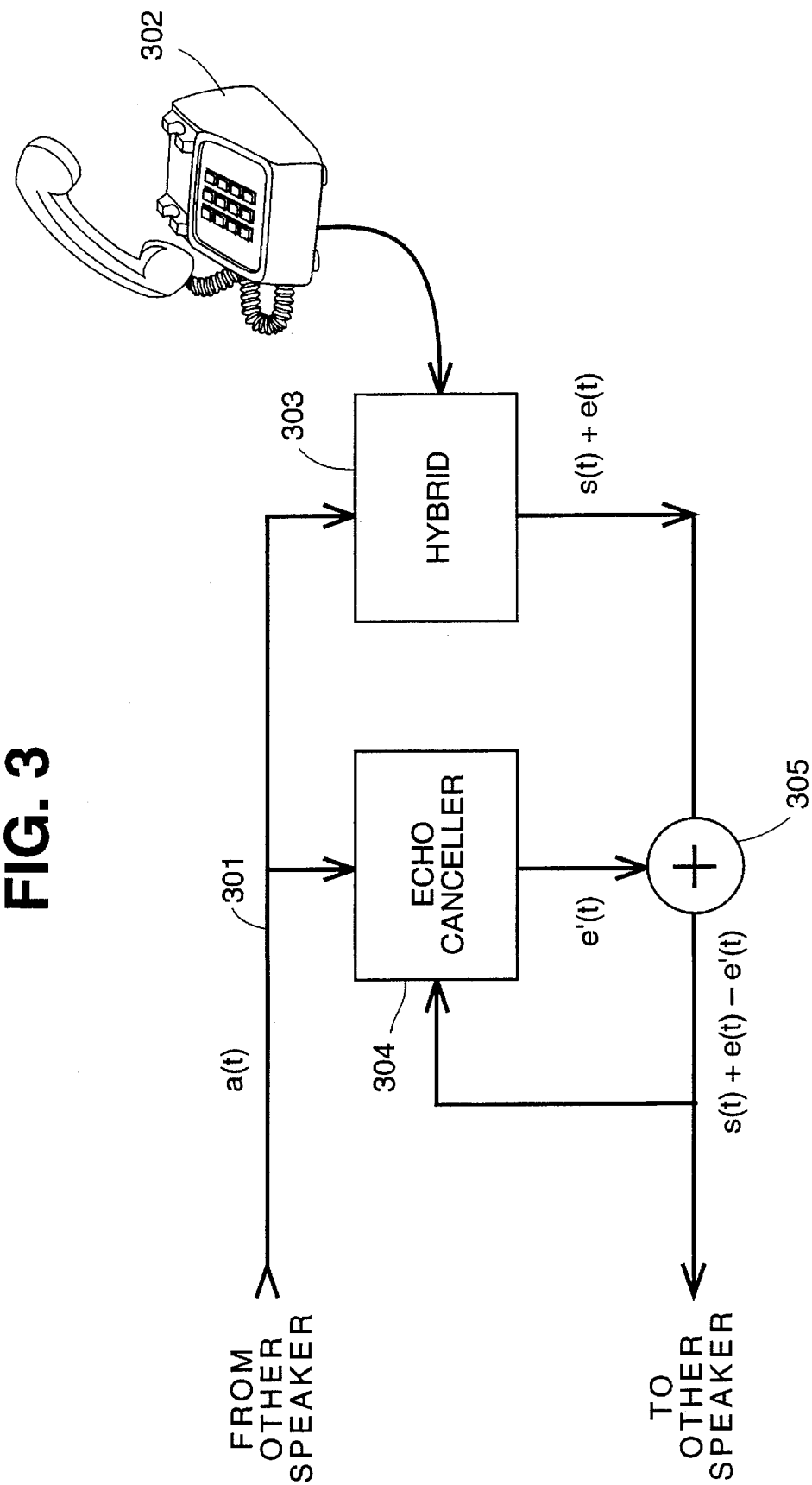
FIG. 3 shows a portion of a telephony system including an echo canceller.

FIG. 3 shows a block diagram of a portion of a typical system including an echo canceller. The echo cancellor of FIG. 3 is arranged to cancel far end echoes. Those of ordinary skill in the art are aware that such echo cancellers can be configured to cancel far end echoes, as in FIG. 3, or near end echoes, as in FIG. 2. Which particular type of echo canceler is used is not critical to the present invention.

An audio signal a(t) is transmitted through telephone line 301 and is transferred to both a hybrid 303 and to an echo canceller 304. A part of the signal a(t) is echoed from hybrid 303 and transmitted back toward the source of a(t). This echoed signal e(t) is added to the outgoing signal s(t) from handset 302 and transmitted toward the remote source of a(t).

The exemplary echo canceller of FIG. 3 operates by estimating, principally from channel characteristics, the echo e(t) which will be produced by the channel. As shown in FIG. 3, echo canceller 304 simulates the transmission channel through hybrid 303, thereby producing an estimate e'(t) of the echo e(t). This estimate is then transmitted to adder 305, where it is utilized to cancel e(t) as shown.

Since the echoed signal, and therefore its estimate e'(t), depend largely upon channel characteristics, and since these characteristics vary, many echo cancellers dynamically adapt the parameters utilized by the echo canceller to produce e'(t). Of course, in practice the cancellation is not perfect.

It can be seen that a(t) and s(t) will be non-zero when there is energy travelling in both directions on the telephone lines (e.g., when speakers on both ends of the connection speak simultaneously). This situation is termed "double talk". When double talk occurs, adaptation of the echo canceller parameters is stopped in order to prevent the echo canceller from becoming unstable.

For the above reasons, most echo cancellers include a double talk detector for distinguishing between actual incident signal (from the remote source), and echo. In accordance with an optional improvement to the present invention, the double talk detector within the echo canceller can be used to modify the parameters of DTMF detector 206. For example, if the double talk detector determines that the only signal being received is echo (i.e., neither voice nor tones are being transmitted from the remote user), the DTMF detector could be turned off. In this manner, the risk of the DTMF detector interpreting an echoed message being played back from VPA 210 as a valid DTMF tone from a remote user is greatly reduced.

In still another optional enhancement, the speech detector can be used to adapt parameters related to the other components of the system, as well as being used to adapt the DTMF parameters. For example, if speech detector 207 detects speech, a signal could be sent to call progress monitor 205, which signal would indicate that a connection has been made.

Figure 4:
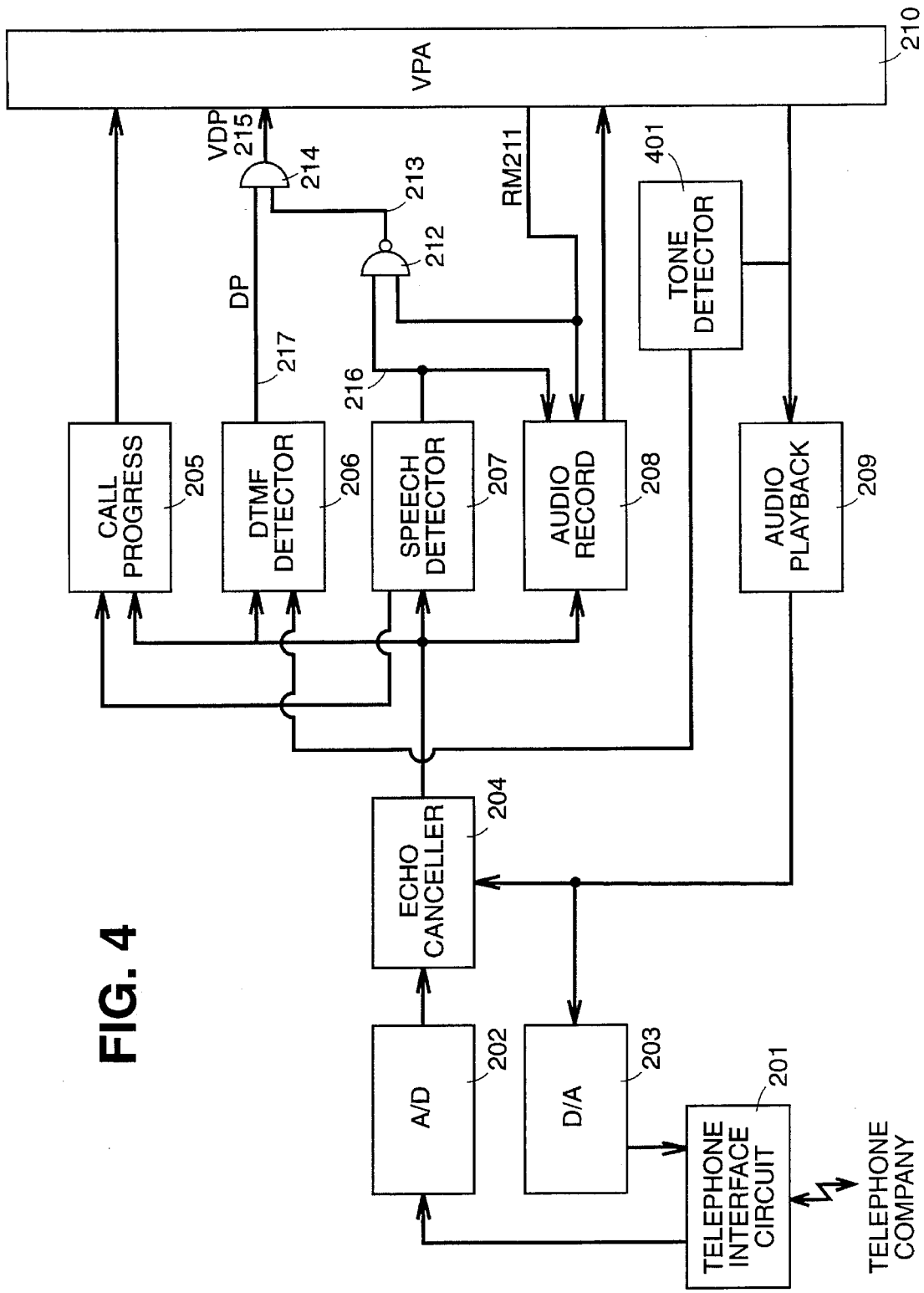
FIG. 4 shows the embodiment of FIG. 2 with an optional and additional tone detector.

In an additional enhancement, the played back message is utilized to assist in adjustment of the parameters of the tone detector. Specifically, with reference to FIG. 4, a second tone detector 401, not to be confused with DTMF detector 206, is utilized to examine the entire bandwidth in which DTMF tones fall. If a DTMF tone is detected as being simulated in a message being played back, then DTMF detector 206 has its parameters adjusted to desensitize it to that particular tone. Such an adjustment to DTMF detector 206 decreases the chance that DTMF detector 206 would incorrectly interpret an echo from an outgoing message as an incoming DTMF tone.

The above describes the preferred embodiment of the invention. It will be apparent to those of ordinary skill in the art that other variations and modifications are possible. The invention is not limited to the exemplary implementations disclosed herein.

We claim:

1. A voice processing system comprising:

a plurality of voice processing components for recording and playing back audio messages;

a speech detector, arranged to analyze a signal being received over a telephone line from a remote user, and to detect whether speech is present in the signal being received;

a tone detector, arranged to analyze the signal being received over the telephone line from the remote user, and for informing said one or more voice processing components when the tone detector detects any one of a plurality of predetermined tones in the signal being received; and means responsive to said speech detector detecting speech in said signal being received for preventing said tone detector from informing said one or more voice processing components when the tone detector detects at least one of the plurality of predetermined tones and only if said voice processing system is recording the audio messages.

2. The voice processing system of claim 1 further comprising an echo canceler for cancelling echoes received from the telephone line.

3. The voice processing system of claim 2 wherein the plurality of tones are DTMF tones.

\* \* \* \* \*

UNITED STATES PATENT AND TRADEMARK OFFICE
CERTIFICATE OF CORRECTION

PATENT NO. : 5,459,781

DATED : October 17, 1995

INVENTOR(S) : Jeffrey I. Kaplan, Montclair; Nicholas Zwick, Denville both of N.J.

It is certified that error appears in the above-identified patent and that said Letters Patent is hereby corrected as shown below:

> On the cover page, item [19] inventor, delete "Kaplan et al" and replace with --Hamilton et al --.
>
> After inventors, item [75] inventor, delete "Jeffrey I. Kaplan" and replace with --Chris Hamilton--.

Signed and Sealed this

Twenty-sixth Day of December, 1995

Attest:

BRUCE LEHMAN

*Attesting Officer*     *Commissioner of Patents and Trademarks*